Figure 5:
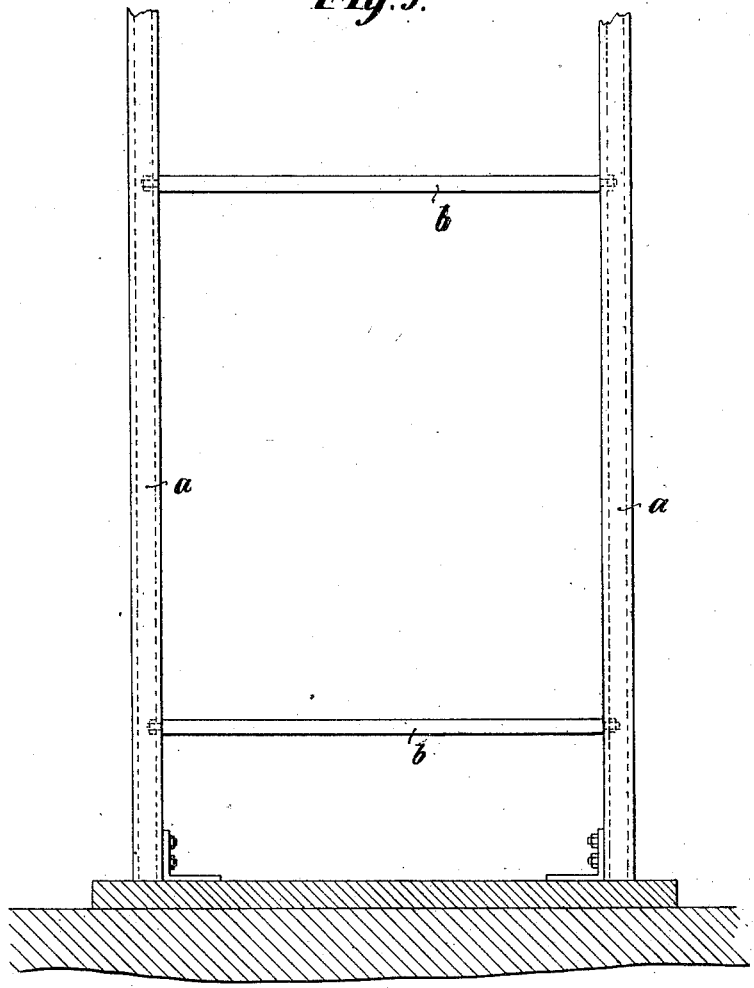

No. 676,785. Patented June 18, 1901.
P. T. L. TOELPE.
MOLD FOR CONCRETE CONSTRUCTION.
(Application filed Jan. 23, 1899.)
(No Model.) 4 Sheets—Sheet 1.
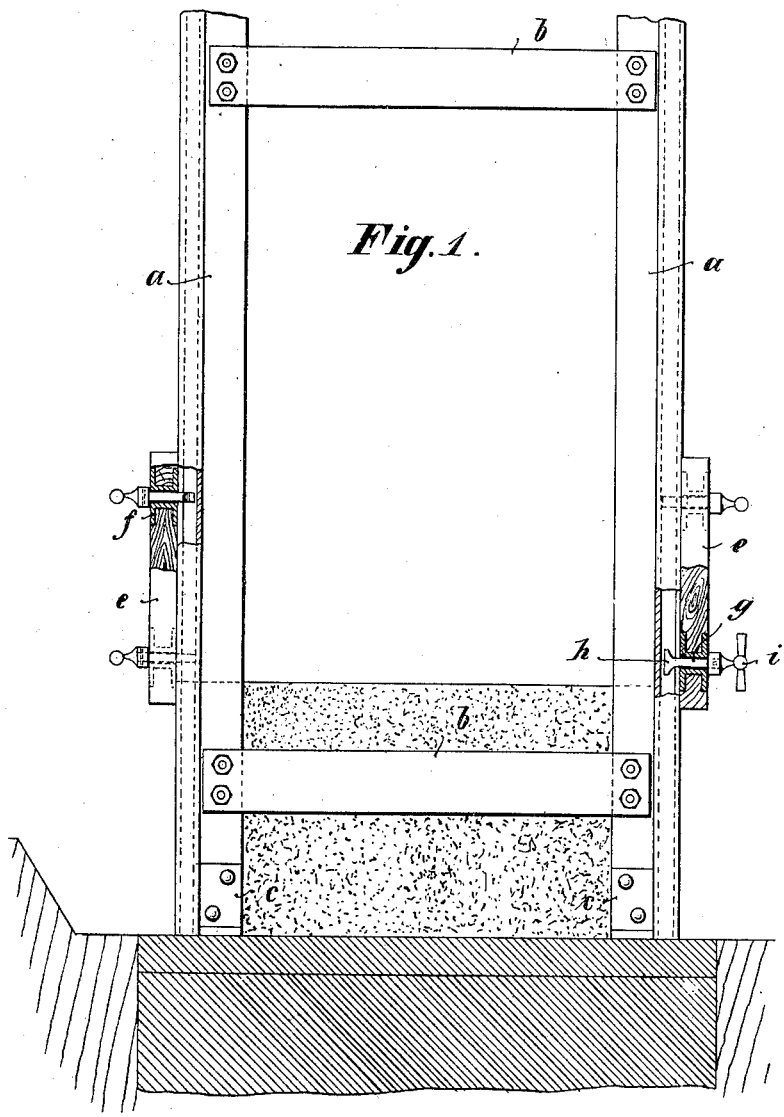

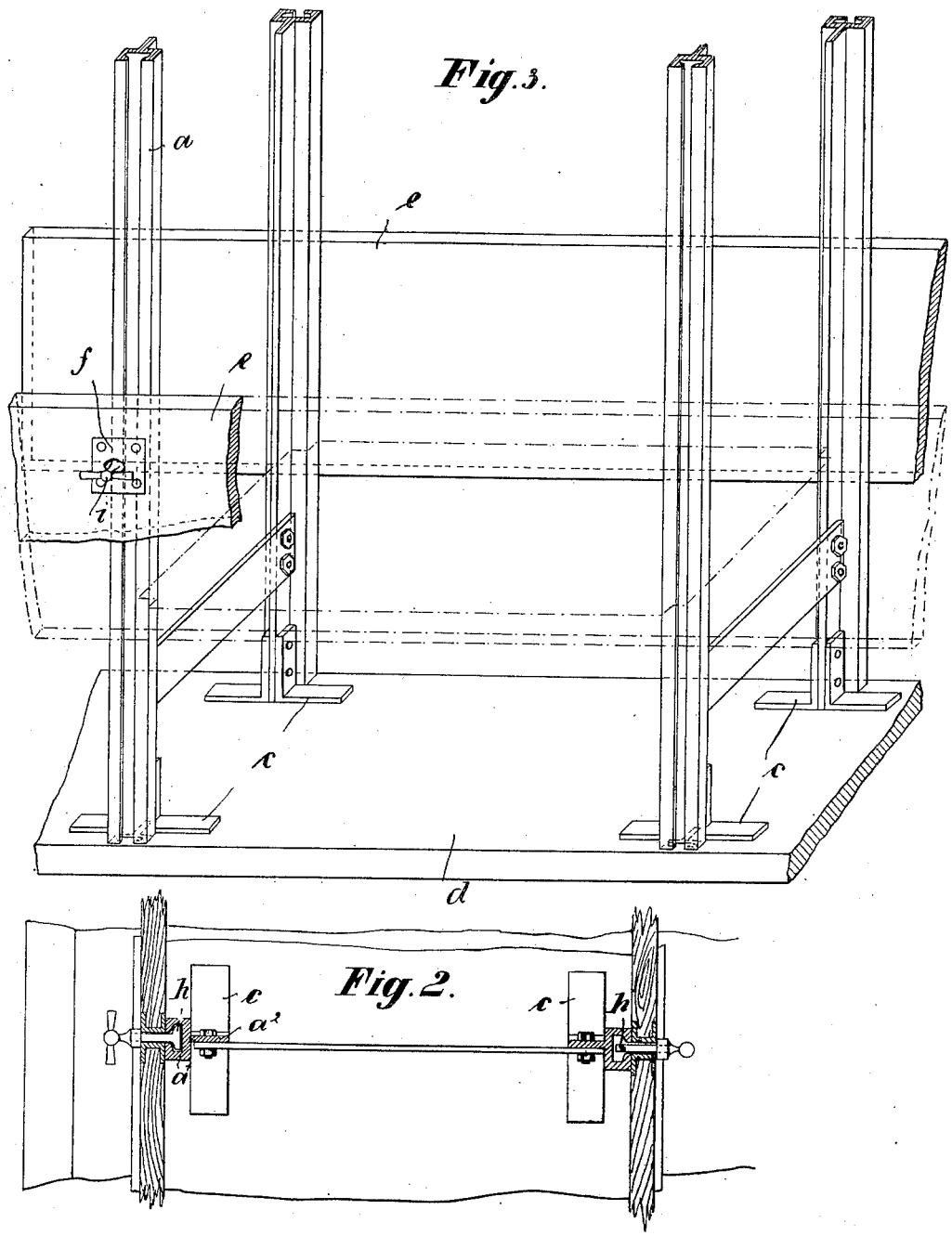

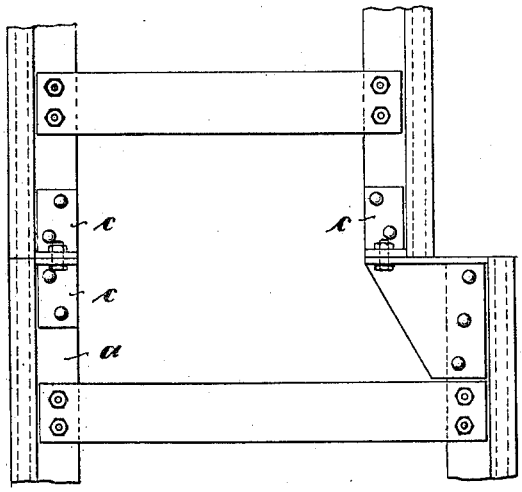
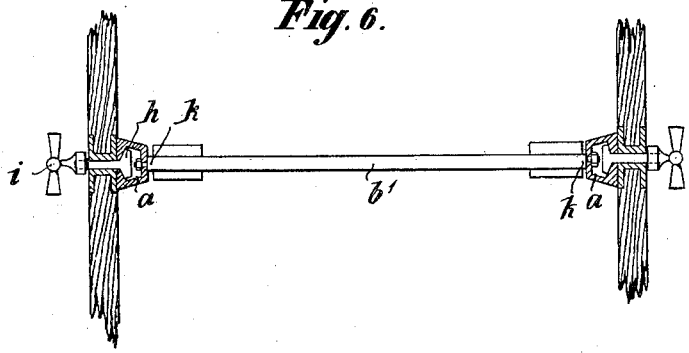

No. 676,785. Patented June 18, 1901.
P. T. L. TOELPE.
MOLD FOR CONCRETE CONSTRUCTION.
(Application filed Jan. 23, 1899.)
(No Model.) 4 Sheets—Sheet 4.

Witnesses:
Waldo M. Chapin
Frank A. Oker

Inventor
P. T. L. Toelpe
by W. J. Rosenbaum
atty.

UNITED STATES PATENT OFFICE.

PHILIPP THEODOR LORENZ TOELPE, OF NEUMÜNSTER, GERMANY.

MOLD FOR CONCRETE CONSTRUCTION.

SPECIFICATION forming part of Letters Patent No. 676,785, dated June 18, 1901.

Application filed January 23, 1899. Serial No. 703,078. (No model.)

*To all whom it may concern:*

Be it known that I, PHILIPP THEODOR LORENZ TOELPE, a subject of the King of Prussia, Emperor of Germany, residing at Neumünster, in the Province of Sleswick-Holstein, Prussia, Germany, have invented certain new and useful Improvements in Molds for Concrete Construction, (for which I have applied for patents in England, dated December 10, 1898, No. 26,143; in Austria, dated December 1, 1898; in Hungary, dated December 5, 1898; in France, dated December 6, 1898, No. 271,640; in Belgium, dated December 6, 1898, No. 109,233; in Sweden, dated December 10, 1898, No. 1,928; in Norway, dated December 10, 1898, No. 10,544; in Denmark, dated December 8, 1898, No. 1,299, and in Germany, dated November 29, 1898,) of which the following is a specification.

In view of the good qualities of concrete when used as a building material—viz., the facility of ready manufacture on the spot where the building operations are being carried on, its quickness in setting after use, and its great hardness, combined with its capacity for resisting compressive and tensile strains—there has always been a great tendency to make walls of concrete where great strength was required without having to consider the question of cost in the building. It is also suitable for making walls of fireproof chambers for the storage of valuables and so-called "strong rooms;" but the cost of making walls according to the processes heretofore usual does not allow of any very extended use of concrete for building large walls and much less entire houses.

The expensiveness of the method of building heretofore employed lay in the necessity for making thick solid walls (sheet-piling) between which the concrete can be rammed or stamped.

Now the essential feature of the present invention consists in being able to erect a complete building or structure of concrete either in the air or under water without the necessity of erecting thick solid walls between which the concrete is rammed. This is effected with the aid of a relatively slight iron framework upon which a number of laths are arranged in a movable manner.

An example of the mode of carrying out this invention is illustrated in the drawings, which show a part of a cribbing for a building.

In the drawings, Figure 1 is a side elevation, partly in section. Fig. 2 is a plan, partly in section. Fig. 3 is a perspective view of a part of a cribbing according to this invention. Fig. 4 is a side elevation illustrating the connection of two parts of a cribbing. Figs. 5 and 6 are modifications of the crib as used for intermediate walls.

As already pointed out, the invention consists, essentially, in constructing the walls in sections in a movable manner, so that by means of a solid part of a wall there can be built in succession a wall, a series of walls, and finally a house. In order to effect this, recourse is had to the use of a light framework. As will be seen from the drawings, the said iron framework consists of iron girders or beams $a$ of a cross-section composed of a T-iron bar and two angle-bars. (Shown in Figs. 2 and 3.) The girders thus consist of a head or top $a'$, with a flat back part $a^2$. Every two girders $a$ are connected together at their flat parts at a certain distance apart by means of flat bars $b$. This distance depends on the thickness which it is desired to give to the wall to be built. At the beginning and at the end of the girder $a$ there are riveted angles $c$, which serve partly for the purpose of erection upon the foundations and partly, as shown in Fig. 4 of the drawings, for the purpose of connecting two girders $a$ together end to end or otherwise by means of bolts or the like. Every two girders $a$ which are connected together by means of the flat bars $b$ constitute an upright of a width equal to the thickness of the wall. For building a wall of a house a number of such uprights are required, which should be previously made to size and mounted ready for use in an iron-works from the working plans of the house. As will be seen from Fig. 3 of the drawings, the finished uprights are now erected upon the top of the foundations $d$ at certain distances apart, which depend upon the circumstances of each particular case. The top of the foundation may advantageously be made of cement plates or slabs. The movable wall parts are then guided by these uprights. The said movable wall parts consist of a thick plank $e$ of not too small dimensions, into which there are let metal sockets or bushes $f$, of metal, at intervals of distance corresponding to those of the several uprights of the framework. Two such metal sockets $f$ are let into the plank $e$ in the vertical direction and keys $g$ are carried through those sockets, Figs. 1 and 2. The keys $g$ consist of a uniform metal piece, which is guided in the sockets $f$ and on which there are formed a head $h$ and a turn-pin $i$. The head $h$ corresponds in cross-section to the internal cross-section of the head $a'$ of the girders. It is formed with slightly beveled or inclined upper edges, and in its cross-section it conforms, on one hand, to the width of the "profile slot" and, on the other hand, to the shape in profile of the channel in the girder-head $a'$. The thick plank $e$ is then placed against the girders $a$ and the keys $g$ are brought into the position shown on the right hand of Fig. 2, so that the heads $h$ take into the slots of the girders $a$. If now the keys are turned by means of the turn-pieces $i$ through ninety degrees, the said keys will, by reason of their conical surfaces, draw themselves into the heads $a'$ of the girders $a$ and their heads will stand across the slot, thereby preventing the same from being pulled out and also producing tight and firm contact and bearing against the plank $a$. The method of building now consists substantially in erecting upon the flat upper surface of the foundation the uprights or girders, said uprights being arranged according to the building plan at determined distances apart, corresponding to the thickness of the wall. The uprights are constructed of determined heights which may, if required, be subdivided. The initial height may be about two meters. To these uprights—that is to say, to the girders $a$—there are now fastened, by means of the above-described keys $g$, thick planks $e$ of about fifty centimeters in height and of a length corresponding to the circumstances. The concrete is then introduced between the space formed by the two opposite planks $e$ and rammed or stamped and then left alone until it has set, which takes about a night. Then the keys $g$ are slacked back and the planks $e$ are pushed up, Fig. 1, until their lower edges come within about three centimeters of the top of the layer of concrete which was stamped the day before. The space which is now formed between the planks $e$ is now again filled with concrete, which is stamped in and allowed to harden. In the case of smooth walls this operation is constantly repeated until the desired height has been reached, which may be made greater by lengthening the girders $a$ and making wider the bars $b$, which connect the girders $a$ together for the purpose of imparting greater stability. If, however, windows, doors, or recesses or openings of any kind are to be provided in the wall, it is merely necessary to insert between the planks $e$ suitably-covered intermediate planks, which are chosen of a height and width corresponding to those of the openings to be provided and which in the case of windows and doors can be made of the usual height and be kept in stock and also be provided with easily-operated means for attaching the same to the smooth planks $e$, such as hooks adapted to engage with bolts and the like.

When cornices or other projecting parts are to be provided on the building, suitably-recessed planks $e$, formed with hollow profiles, may be employed, or also for the purpose of subsequently applying profile-pieces of this kind there may be employed internally-projecting fillets which produce in the finished wall small recesses, which give the cornice, which in this case is to be applied subsequently, a stronger hold in or union with the finished wall-surface.

The iron framework or skeleton which remains in the finished wall imparts considerable strength to the latter and allows of carrying the building quite straight up—i. e., vertically. In the case of walls under water—such as quay-walls, bridges, piers, &c.—this method of building will be found of great advantage; but in erecting buildings in which the inside walls act to stiffen the outer walls it is not necessary to utilize the iron framework for the purpose of stiffening the walls, and it will be of advantage for the sake of economy to be able to dispense with this iron framework. In order to enable this to be done, the framework is constructed in the manner illustrated in Figs. 5 and 6. These figures show the girders $a$ without the wide lugs, flat back parts $a^2$ of the first-described construction, but instead with U shape and formed with conically-tapering or inclined walls, as shown in Fig. 6 of the drawings. Instead of the connecting flat bars $b$ of iron solid thick rods $b'$ are employed, which effect the connection of two girders $a$ together by means of nuts $k$. The connection of the several girders $a$ is effected by means of suitable flat angles, which, however, cannot be removed afterward; but they are only used in such small quantities and have such little value that their loss will not be felt. The removal of the girders $a$ is effected after the nuts $k$ of the connecting-rods $b'$ have been slacked back. This is done by simply lifting them out, because the conical or tapering shape of the girders renders their adhesion to the cement difficult. The connecting-rods $b'$ are knocked out and, like the iron girders $a$, can be used again for other buildings. The thick planks $e$ can be used over again repeatedly, and thus they constitute only one initial expense to the builder. The entire construction is very cheap and is particularly suitable for building simply-arranged buildings—such as villas, sheds, and agricultural and farm buildings and warehouses—and also especially in the cases of buildings where it is difficult to get skilled labor, because skilled workmen are only necessary for erecting the framework or scaffolding, while the stamping-in of the concrete can be readily done by unskilled laborers.

What I claim, and desire to secure by Letters Patent of the United States, is—

A framework or crib for the erection of concrete structures consisting of hollow metal standards provided with vertical slots, means for maintaining the standards at definite distances apart, in combination with planks or plates secured to said standards and keybolts passing through said planks or plates and provided with cross-heads which enter the standards through the slots therein and which may be released therefrom by turning said cross-heads into line with the slots, substantially as described.

In testimony whereof I have hereunto set my hand in the presence of two witnesses.

PHILIPP THEODOR LORENZ TOELPE.

Witnesses:
   MAGNUS HEINRICH DIETRICH SCHLICHTIG,
   GUSTAV WEBER.